United States Patent [19]

Schwartz

[11] Patent Number: 4,903,980
[45] Date of Patent: Feb. 27, 1990

[54] CONNECTOR FOR CHILD STROLLER SUB-ASSEMBLIES

[75] Inventor: Leo Schwartz, Montreal, Canada

[73] Assignee: Dorel Industries Inc., Montreal, Canada

[21] Appl. No.: 269,069

[22] Filed: Nov. 9, 1988

[30] Foreign Application Priority Data

Sep. 6, 1988 [CA] Canada .................................. 576591

[51] Int. Cl.⁴ .............................................. B62B 7/08
[52] U.S. Cl. .................................... 280/647; 280/658; 403/108
[58] Field of Search ............... 280/647, 657, 658, 642, 280/47.38; 403/108, 329, 379; 297/429, DIG. 4, 337, 363, 364

[56] References Cited

U.S. PATENT DOCUMENTS

| | | | |
|---|---|---|---|
| 2,582,435 | 1/1952 | Howard | 280/47.18 |
| 2,633,363 | 3/1953 | Marshall | 280/47.18 |
| 2,843,393 | 7/1958 | Dahlander, Sr. | 280/47.18 |
| 3,162,460 | 12/1964 | Davidson | 280/647 |
| 3,698,736 | 10/1972 | Shape | 280/47.18 |
| 4,392,690 | 7/1983 | Anderson | 280/647 |
| 4,412,689 | 11/1983 | Lee | 280/47.18 |
| 4,528,998 | 7/1985 | Gamm | 403/108 |
| 4,577,877 | 3/1986 | Kassai | 280/642 |
| 4,753,453 | 6/1988 | Schilbach | 280/643 |
| 4,759,559 | 7/1988 | Moulton | 280/47.18 |
| 4,770,467 | 9/1988 | Zinn | 403/108 |

Primary Examiner—Charles A. Marmor
Assistant Examiner—Richard Camby
Attorney, Agent, or Firm—Oblon, Spivak, McClelland, Maier & Neustadt

[57] ABSTRACT

A connector for a child vehicle, such as a stroller or carriage, for connecting sub-assemblies to the tubular frame of the vehicles. The sub-assemblies each have a connecting portion for close mating fit with associated connecting free end portions of the tubular frame. The mated portions are interconnected by a spring-biased connecting member which is provided in one of the mated connecting portions or connecting free end portions, and has a lock element locatable in a through bore in the other portion. The lock element is retractable inwardly of the through bore for disconnecting the mated portions.

8 Claims, 2 Drawing Sheets

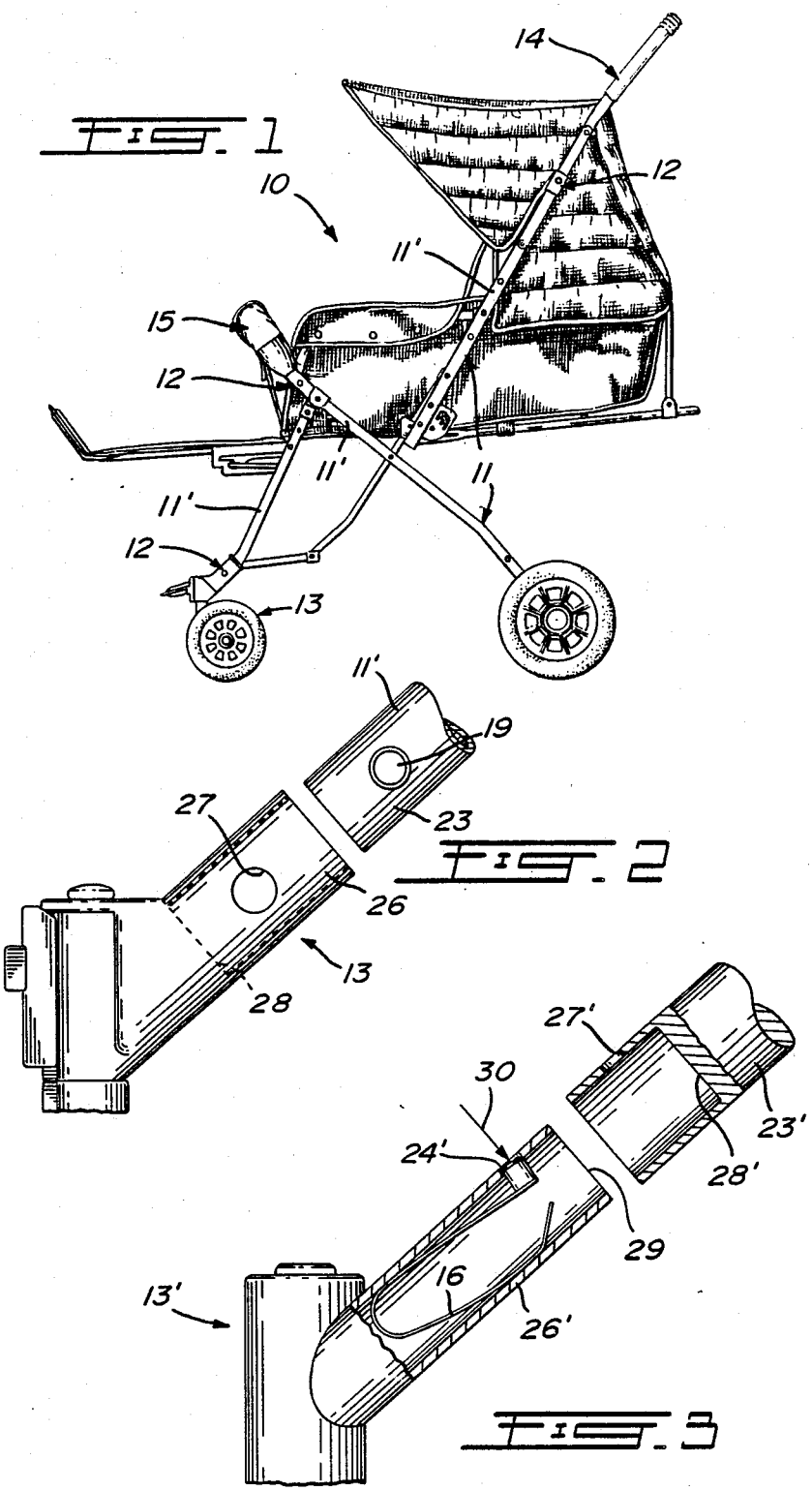

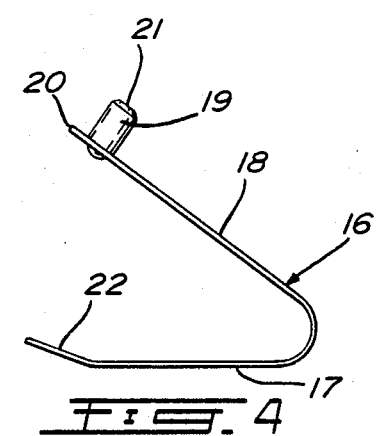
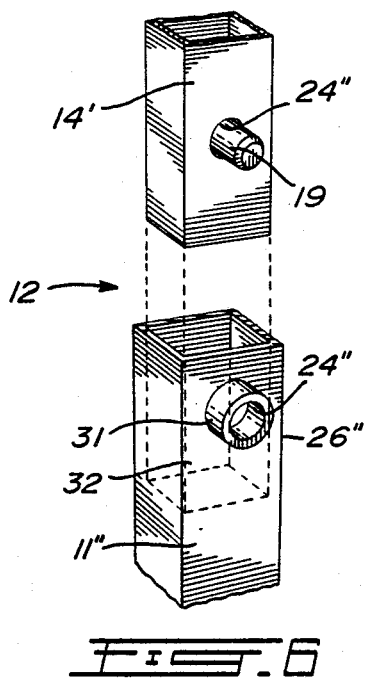
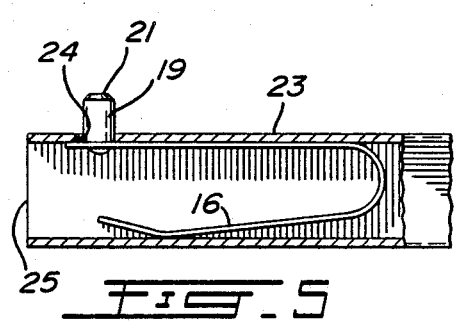
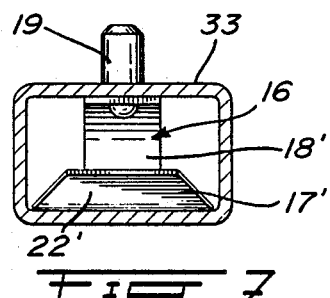

CONNECTOR FOR CHILD STROLLER SUB-ASSEMBLIES

BACKGROUND OF INVENTION

1. Field of Invention

The present invention relates to a connector for a child vehicle, such as a stroller or carriage, and for connecting various sub-assemblies, such as the wheels of the stroller, the handle, and the front gate, or other accessories to the vehicle tubular frame by means of a snap-type attachment.

2. Description of Prior Art

Child strollers, carriage, or similar type vehicles are usually constructed with all their parts riveted together and to a frame. Accordingly, a disadvantage of this type construction is that when a part of the vehicle requires repair, it is necessary to transport the entire vehicle to a repair shop, or to the store where the vehicle was purchased. Accordingly, there is much manipulation of a large object in order to have a small defective part thereof repaired. This is costly and time consuming. Also, some vehicles may have a few parts thereof secured to the frame in a replaceable manner, but it usually requires some expert skill in order to disassemble the parts for repair.

SUMMARY OF INVENTION

It is a feature of the present invention to provide a connector for a child stroller, carriage or similar vehicle, for connecting sub-assemblies, such as the wheel of the vehicle, the handle, the front gate, etc. to the tubular frame of the vehicle and wherein the connector is provided with a spring-biased connecting member to provide easy connection and removal of the sub-assemblies to the frame.

Another feature of the present invention is to provide a connector for a child stroller, carriage or similar vehicle and wherein the connector utilizes a simple spring member with a locking pin which is easy to install and easy to operate, and which is inexpensive to fabricate.

Another feature of the present invention is to overcome the above-mentioned disadvantages of the prior art and wherein the sub-assemblies of a child stroller, carriage or similar vehicle, may be easily disconnected from the frame of the vehicle for repair or replacement and wherein such replacement may be effectuated by an unskilled person.

According to a broad aspect of the present invention there is provided a connector for a child vehicle, such as a stroller or carriage for connecting sub-assemblies to the tubular frame of the vehicle. The sub-assemblies each have a connecting portion for close mating fit with associated connecting free end portions of the tubular frame. The mated portions are interconnected by a spring-biased connecting member which is provided in one of the mated connecting portions or connecting free end portions, and has a lock element locatable in a through bore in the other portion. The lock element is retractable inwardly of the through bore for disconnecting the mated portions.

BRIEF DESCRIPTION OF DRAWINGS

A preferred embodiment of the present invention will now be described with reference to the examples thereof as illustrated in the accompanying drawings in which:

FIG. 1 is a side view of a child stroller vehicle equipped with connectors constructed in accordance with the present invention;

FIG. 2 is an enlarged fragmented side view showing the construction of the connector as associated with a wheel sub-assembly of a stroller;

FIG. 3 is a fragmented side view, similar to FIG. 3, but showing a modification of the connector and the location of the spring member in a connecting portion of a wheel sub-assembly;

FIG. 4 is a side view showing the construction of the spring member;

FIG. 5 is a fragmented side view showing the spring member located in a free end portion of a tubular frame;

FIG. 6 is an exploded perpective view showing another example of the connector of the present invention;

FIG. 7 is a cross-section view of a free end portion of the tubular frame showing another configuration the spring member; and FIG. 8 is a view similar to FIG. 7 but showing a tubular frame of a different cross-section.

DESCRIPTION OF PREFERRED EMBODIMENTS

Referring now to the drawings, and more particularly to FIG. 1, there is shown generally at 10 a child stroller vehicle which is also convertible into a carriage, and having a tubular frame 11 consisting of various tubular members 11′, and to which is secured, by the connector 12 of the present invention, a plurality of sub-assemblies such as the front boggie wheels 13, a handlebar 14, and a front gate 15. These connectors 12 provide an automatic snap-lock feature so that the sub-assemblies 13, 14 and 15 can easily be detached from the frame, but once engaged thereto are positively locked to the frame.

Referring now to FIGS. 2 to 4, there is shown the construction of the connector. As herein shown, the connector includes a spring member 16 which, as shown in FIG. 4, is a substantially V-shape leaf spring member formed with a bottom leaf portion 17 and a top lock element carrying spring-biasing portion 18. A lock pin 19 is secured adjacent a free end 20 of the spring-biasing portion 18. The circumferential free end of the lock pin 19 is preferably tapered, such as shown at 21, to ensure that the pin does not remain engaged with the side edge of the pin locating hole 24 in the tubular member where it is installed. The free end portion 22 of the bottom leaf portion 17 is upwardly turned towards the lock element carrying portion 18 to facilitate positioning the spring in a connecting free end portion 23 of the the tubular frame member 11′, as shown in FIG. 2 and as will be described hereinbelow.

As shown in FIGS. 2 and 5, the tubular end portion 23 of the frame, herein a tubular portion 11′ adjacent the wheel assembly 13, is provided with a spring member 16 located inside the tubular member. Also, the tubular end portion is provided with a pin locating hole 24 adjacent the free end 25 thereof. The spring 16 has opposed leaves 17 and 18 compressed close to one another and is slid into the tubular member from the open end, and the compression is released once the pin 19 is aligned with the locating hole 24. The pin then automatically protrudes out of the hole 24 and the spring abuts on opposed sides of the hole 24 by pressure and remains in place, as shown in FIG. 5. The spring force urges the pin 21 outwardly in the position as shown in FIG. 5.

As can be seen in FIG. 2, the wheel assembly 13 is provided with a connecting cylinder or connecting portion 26 and has a through bore 27 located in the wall thereof and positioned for alignment with the pin 19 when the connecting free end portion 23 of the frame is received therein and abuts against a bottom abutting wall 28, or any stop member located inwardly of the cylinder portion 26. To connect the wheel sub-assembly 13 to the frame, it is only necessary to push the pin 19 inwardly of the connecting free end portion 23 and to insert this end portion 23 within the cylinder portion 26 with the pin depressed. As soon as the pin engages the inside wall of the cylinder portion the cylinder portion is pushed into the end of the frame until the pin 19 locates and protrudes out of the through bore 27, thus positively locking the wheel sub-assembly 13 to the frame.

FIG. 3 shows an alternative construction of this connector and wherein the connecting free end portion 23' of the frame is formed as a cylinder portion and provided with a bottom wall 28' to arrest a free end 29 of the tubular cylindrical portion 26' associated with the wheel sub-assembly 13'. The spring 16 is herein shown located inside the cylinder portion 26'. The through bore is now located at 27' in the free end portion 23' of the tubular frame, and the pin locating hole 24' is now associated with the cylindrical portion 26'. The arrow 30 indicates the direction of pressure applied against the lock pin to locate same inside the hole 24 or flush with the outer surface of the cylindrical portion 26' to locate same within the free end portion 23' of the frame.

Referring now to FIG. 6, there is shown a same type connector, but associated with a rectangular tubular frame member 11". As herein shown, the handle sub-assembly 14 is provided with a connecting portion 14' and also having a pin locating hole 24" through which the pin 19 protrudes. When the connecting portion 14 is mated within the cup portion 26" the pin 19 protrudes out of the through bore 24". A circumferential flange wall 31 is provided about the through bore 24' and extends outwardly of the wall 32 a distance at least equal to the length of the pin 19 extending out of the through bore 24". This prevents the pin 19 from being accidentally depressed and makes it more difficult for a child to tamper with the connector.

FIGS. 7 and 8 show alternative configurations of the spring member 16. As herein shown, the bottom leaf portion 17' of the spring may be much wider than the top portion 18' for better friction fit when utilized with a rectangular tubular member 33. The lock element carrying portion 18' is however narrower, as it must flex within the tubular member. The free end portion 22' or lip portion is elevated whereby to facilitate insertion and removal of the spring element within the tubular member, and this portion can be grasped by a pair of pliers, if necessary.

FIG. 8 shows a still further variation for friction fit within a circular tubular member 34.

It is within the ambit of the present invention to cover any obvious modifications of the examples of the preferred embodiment described herein, provided such modifications fall within the scope of the appended claims. For example, the locking pin may have a different configuration as well as the pin locating hole and the through bore. The spring-biased connecting member may also have a different configuration altogether.

The embodiments of the invention in which an exclusive property or privilege is claimed are defined as follows:

1. A connector for a child stroller, carriage or similar child vehicle for connecting sub-assemblies thereto for easy removal of said sub-assemblies by a user person and wherein said vehicle has a tubular frame to which said sub-assemblies are each secured through a respective one of said connectors, said sub-assemblies each having a connecting portion for close mating fit with connecting free end portions of said tubular frame, said mated portions being interconnected by a spring-biased connecting member provided in one of said mated connecting portions or connecting free end portions, and having a lock element automatically locatable in a through bore in the other portion, said lock element having means for retracting same inwardly of said through bore for disconnecting said mated portions whereby one or more of said sub-assemblies may be disconnected and removed from said tubular frame without the use of special tools, said spring member being a V-shaped leaf spring member formed with a bottom leaf portion and a top lock element carrying portion, said spring being located in compression in an enclosure adjacent said mating wall section having said hole with said lock element aligned with said hole, said spring being retained in tight friction fit in said enclosure by compression force exerted on enclosure walls by said leaf spring, said bottom leaf portion having an inwardly bent engageable free end section extending toward said top lock element carrying portion and elevated above an inner surface of said enclosure, said engageable end section permitting ease of locating and removal of said spring member in said enclosure.

2. A connector as claimed in claim 1 wherein said connecting member is a spring member having said lock element secured thereto, said element extending through a hole in a mating wall section of either of said mated portions, said lock element being a locking pin retractable inwardly of said mating wall section by pressure applied at a pin free end thereof which is aligned with said tthrough bore so that said lock element automatically enters said through bore to lock said mated portions, said means for retracting same being constituted by said free end whereby upon application of axial pressure on said free end said locking pin retracts inwardly of said through bore.

3. A connector as claimed in claim 2 wherein said locking pin free end has a tapered circumferential edge, said pressure applied at said pin free end being a finger pressure.

4. A connector as claimed in claim 1 wherein said enclosure is a hollow tubular end section of said frame connecting free end portions.

5. A connector as claimed in claim 4 wherein said sub-assemblies connecting portion is a tubular portion having a cavity in a free end thereof for receiving said tubular end section in close sliding fit therein, said through bore being provided in a side wall of said tubular portion.

6. A connector as claimed in claim 5 wherein said cavity has a base wall, said tubular end section having an end thereof abutting said base wall with said lock element aligned with said through bore.

7. A connector as claimed in claim 2 wherein said through bore is provided with a circumferential flange extending outwardly of an outside wall thereabout, said flange extending outwardly a distance at least equal to said free end of said locking pin located therein.

8. A connector as claimed in claim 1 wherein said enclosure is a hollow tubular connecting portion of a wheel sub-assembly.

* * * * *